United States Patent
Yen et al.

(10) Patent No.: US 6,873,110 B2
(45) Date of Patent: Mar. 29, 2005

(54) HID SINGLE LIGHT EMITTING POINT LAMP TUBE SWITCHING DEVICE FOR SWITCHING LAMP TUBE IN POSITIONS OF FAR LIGHT AND NEAR LIGHT AND THE METHOD OF THE SAME

(76) Inventors: Chin-Fa Yen, 235 Chung-Ho Box 8-24, Taipei (TW); Kuo-Pin Yen, 235 Chung-Ho Box 8-24, Taiwan (TW)

( * ) Notice: Subject to any disclaimer, the term of this patent is extended or adjusted under 35 U.S.C. 154(b) by 0 days.

(21) Appl. No.: 10/262,343

(22) Filed: Oct. 2, 2002

(65) Prior Publication Data

US 2004/0066144 A1 Apr. 8, 2004

(51) Int. Cl.⁷ .............................. B60Q 1/02; H01H 3/26
(52) U.S. Cl. .......................... 315/82; 315/83; 315/344; 307/143; 307/141
(58) Field of Search .............................. 315/82, 83, 80, 315/81, 76, 344, 362, 77, 193, 185 R, 267, 291, 298, 307, 360, DIG. 4; 307/143, 141, 139, 140, 141.4, 10.1, 10.8; 340/480, 477, 468, 469, 475

(56) References Cited

U.S. PATENT DOCUMENTS

| | | | | |
|---|---|---|---|---|
| 4,683,403 A | * | 7/1987 | Iwamoto et al. | 315/83 |
| 4,890,037 A | * | 12/1989 | Izawa et al. | 315/77 |
| 5,510,951 A | * | 4/1996 | Briedis et al. | 361/154 |
| 5,592,146 A | * | 1/1997 | Kover, Jr. | 340/468 |
| 5,661,368 A | * | 8/1997 | Deol et al. | 315/82 |
| 6,452,337 B1 | * | 9/2002 | Murata | 315/82 |
| 6,580,220 B1 | * | 6/2003 | Yen | 315/82 |

* cited by examiner

Primary Examiner—Tuyet Thi Vo

(57) ABSTRACT

An HID single light emitting point lamp tube switching device is provided for switching the lamp tube between a far light position and a near light position. Initially, a strong current coil and a weak current coil are induced at the same time, so that the HID single light emitting point are moved to the second position, and at end of a time period set in the timer, the strong current coil will be interrupted so that only the weak current coil is actuated to maintain the HID single light emitting point in the second position.

2 Claims, 2 Drawing Sheets

HID SINGLE LIGHT EMITTING POINT LAMP TUBE SWITCHING DEVICE FOR SWITCHING LAMP TUBE IN POSITIONS OF FAR LIGHT AND NEAR LIGHT AND THE METHOD OF THE SAME

FIELD OF THE INVENTION

The present invention relates to switch of high intensity discharge (HID) single light emitting point lamp tubes, and particularly to a device for controlling switching of a far light and a near light in a HID single light emitting point lamp tube by a weak current and the method of the same.

BACKGROUND OF THE INVENTION

In the prior art, for a lamp having a light emitting point, a switch is used for switching the light emitting point to project light between a far light position and a near light position. Since the prior art lamp has weak illumination and consume large power, HID single light emitting point lamps are developed, which can improved the defects in the prior art. However, using two light emitting points in the HID lamp is difficult. Thereby, in general two HID lamps are used, but this method will increase cost. Moreover, the prior art lamp can not be updated with the HID lamp.

To improve above said defects, a switching for switching the HID lamp is developed, where a single one coil is used to control the switching operation. However, a too large current will cause the coil to burn out, while a small current will cause that the coil can not generate a sufficient force to move the HID lamp.

SUMMARY OF THE INVENTION

Accordingly, the primary object of the present invention is to provide an HID single light emitting point lamp tube switching device for switching the lamp tube in positions of a far light position and a near light position; the HID single light emitting point lamp tube having a HID single light emitting point therein, initially the HID single light emitting point being positioned in a first position. The device comprises a first relay having a first coil and a first pair of joints; the first coil being connected to a switching for switching the lamp tube in positioned of far light and near light; a second relay having a second coil and a second pair of joints; a strong current coil having a first end connected to one joint of the second relay and a second end connected to a power source; the strong current coil being coupled to a light emitting point in the HID single light emitting point A lamp tube; a weak current coil having a first end connected to one joint of the first relay and a second end connected to a power source; the current providing by the weak current coil being weaker then that of the strong current coil; the weak current coil being coupled to the HID single light emitting point; a timer having an output connected to second coil in the second relay; one input of the timer being connected to the second end of the strong current coil; and another input of the timer being connected to the other joint of the pair of joint of the first relay; wherein by the current from the strong current coil and the weak current coil, the HID single light emitting point is magnetically induced so as to move to a second position; when the switch is positioned to cause the first coil to conduct, the strong current coil and weak current coil are induced at the same time, so that the HID single light emitting point are moved to the second position, and at end of a time period set in the timer, the strong current coil will be interrupted so that only the weak current coil is actuated to maintain the HID single light emitting point in the second position.

The various objects and advantages of the present invention will be more readily understood from the following detailed description when read in conjunction with the appended drawing.

DETAILED DESCRIPTION OF THE PREFERRED EMBODIMENTS

Figure 1:
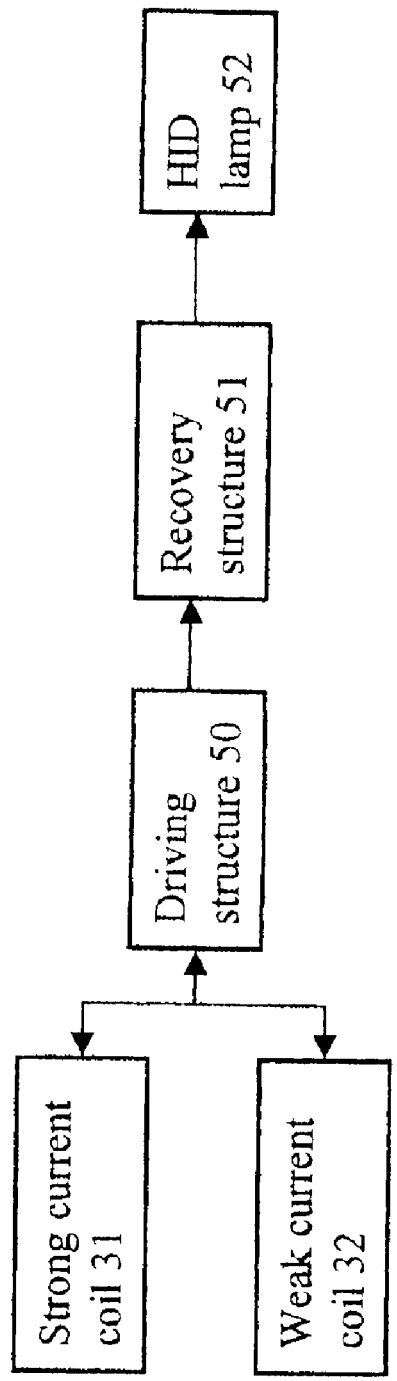
FIG. 1 illustrated a HID lamp driving structure suitable in the present invention.

Referring to FIG. 1, a HID lamp driving structure suitable in the present invention is illustrated. It is illustrated that that HID lamp driving structure. The HID lamp structure has a strong current coil 31, a weak current coil 32, a driving means 50 and a recovery means 51. The recovery means 51 is further connected to an HID lamp 52. A strong current coil 31 is a coil which can is provided with a strong current so as to drive the driving means 50 and the weak current coil 32 is a coil which is provided with a weak current so as to drive the driving means 50.

The driving means 50 are electromagnetically coupled to the strong current coil 31 and weak current coil 32. The driving means 50 is a metal body. When one of the strong current coil 31 and the weak current coil 32 is powered, the powered coil will generate a magnetic field. This magnetic field will be magnetically coupled to the driving means 50 so as to move the driving means 50. Thereby, the driving means 50 will further push the HID lamp 52. As the power is not provided, the recovery means 51 will provide a recovery force to the driving means 50 so as to recover the driving means 50 to the original place.

The recovery means 51 may be, for example, a spring. When the driving means 50 moves to drive the HID lamp 52, the spring will be compressed (or be pulled out, depending upon the installation of the spring, but this will not confine the scope of the present invention). When the action of the coil upon the driving means 50 disappears, the the spring will restore to an original position.

The following will described the way for controlling the action of the strong current coil 31 and the weak current coil 32 in the present invention.

Figure 2:
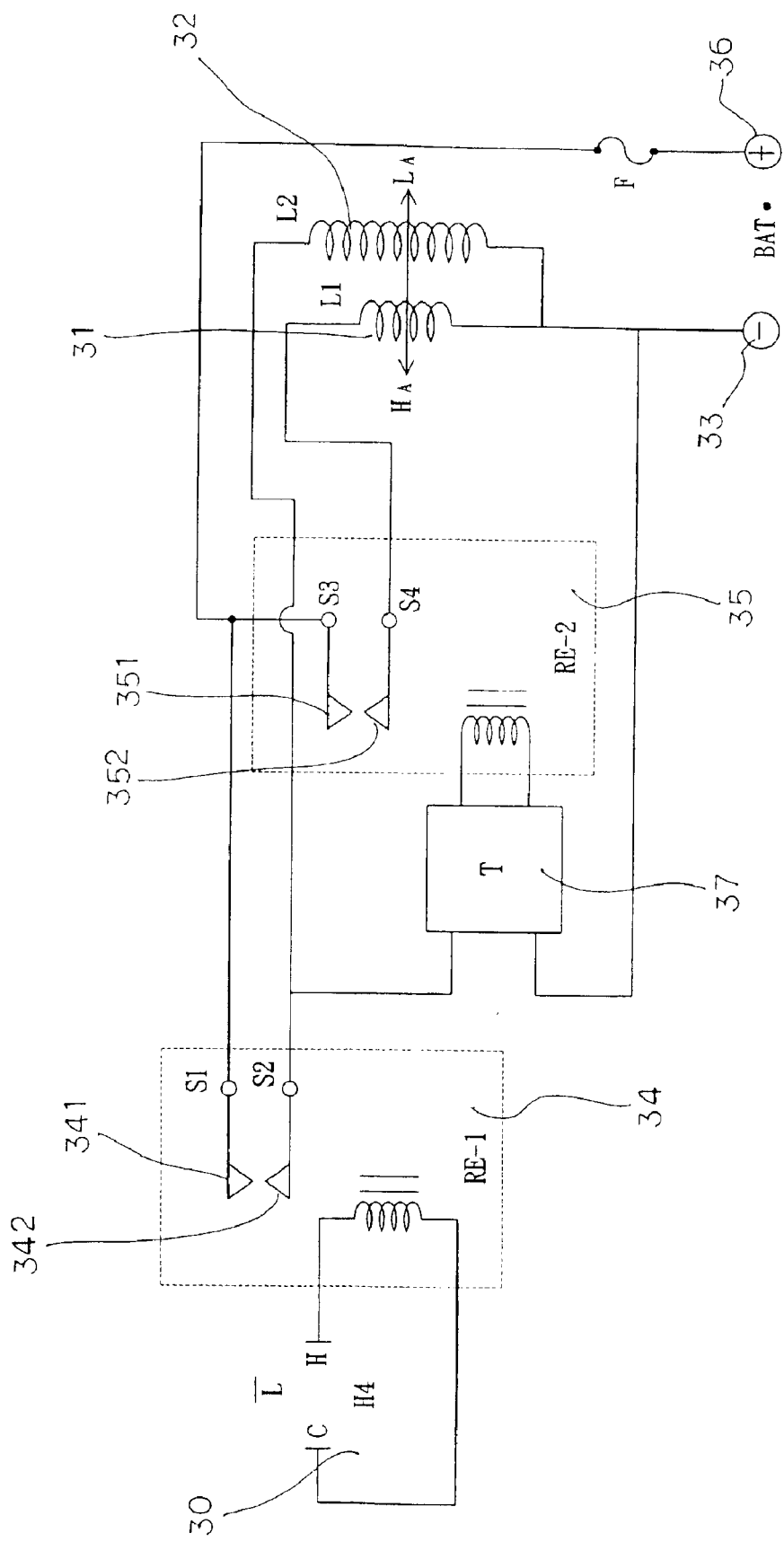
FIG. 2 shows the circuit diagram of the present invention.

The circuit of the present invention is illustrated in FIG. 2. The present invention includes a strong current coil 31 and a weak current coil 32 which are connected in parallel. One end of the strong current coil 31 and one end of the weak current coil 32 are connected to a negative end of a power source 33. The other end of the strong current coil 31 is connected to a joint 352 of a second relay 35 and the other end of the weak current coil 32 is connected to a joint 342 of the first relay 34. The normally open joint 341 of the first relay 34 and the normal open joint 351 of the second relay 35 are connected to a positive joint 36.

The first relay 34 has a first coil 343 and two joints 342, and 341, and is connected to a switch 30 for switching the position of the far light $H_A$ and the near light $L_A$. The second relay 35 has a second coil 353 and has two joints 351 and 352 is connected to a reverse counting timer circuit 37. The reverse counting timer circuit 37 is connected to the joint 342 of the first relay 34.

By above components, when the switch 30 is set at a far light position $H_A$, the first relay 34 receive power from the switch 30 and thus operates. Then the normally open joint 341 and central joint 342 are closed. Thereby, the positive power is conducted and the reverse counting timer circuit 37 is also conducted. Then the second relay 35 operates, the joint 351 and joint 352 are closed. The strong current coil 31 and weak current coil 32 are powered so that the HID lamp tube is changed to far light position $H_A$ from near light position $L_A$ to move the focus. Then the reverse counting timer circuit 37 counts, after a predetermined time period set at the timer circuit 37, the second relay 35 is released so that the strong current coil 31 is interrupted, but the power supplied through the first relay 34 is not released. Thereby, the HID lamp tube is retained in far light position $H_A$. The weak current coil 32 retains in conduction so as to retain the position of the far light $H_A$ until the switch 30 switches to near light position $L_A$.

In above circuit, when the HID lamp tube retains in the far light position $H_A$, since only a small current is necessary to be provided to the weak current coil 32, the overheat will not be induced in the weak current coil 32.

In the present invention, the strong current coil 31 provides initial current for the HID single light emitting point lamp tube to move from near light position $L_A$ to far light position $H_A$. After it is positioned, the reverse counting timer circuit 37 is used to interrupt the power of the strong current coil 31. At this time, the weak current coil 32 conducts continuously to avoid the overheat of the control power and resolve the problem of weak control power, The normally open joints and central joints of the two relays are connected to the battery of a car and the strong current coil and weak current coil so as to control HID single light emitting point lamp tube.

The relay connected to the strong current coil can be released within a preset interval through the reverse counting timer circuit.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An HID single light emitting point lamp tube switching device for switching the lamp tube between a far light position and a near light position; the HID single light emitting point lamp tube having a light emitting point therein, initially the HID single light emitting point being positioned in a first position; comprising:

a first relay having a first coil and a first pair of joints; the first coil being connected to a switching for switching the lamp tube between a far light position and a near light position;

a second relay having a second coil and a second pair of joints;

a strong current coil having a first end connected to one joint of the second relay and a second end connected to a power source; the strong current coil being magnetically coupled to the light emitting point in the HID single light emitting point lamp tube;

a weak current coil having a second end connected to one joint of the first relay and a second end connected to a power source; the current provided by the weak current coil being weaker then that of the strong current coil; the weak current coil being magnetically coupled to the HID single light emitting point;

a timer having an output connected to second coil in the second relay; one input of the timer being connected to the second end of the strong current coil; and another input of the timer being connected to the other joint of the pair of joint of the first relay;

wherein by the current from the strong current coil and the weak current coil, the HID single light emitting point is magnetically induced so as to move to a second position;

when the switch is positioned to cause the first coil to conduct, the strong current coil and weak current coil are induced at the same time, so that the HID single light emitting point are moved to the second position, and at end of a time period set in the timer, the strong current coil will be interrupted, so that only the weak current coil is actuated to maintain the HID single light emitting point in the second position;

wherein the first position is a far light position which cause the HID single light emitting point to emit far light, and the second position is a near light position which cause the HID single light emitting point to emit near light; and wherein the second position is a far light position which cause the HID single light emitting point to emit far light, and the first position is a near light position which cause the HID single light emitting point.

2. A method for switching HID single light emitting point lamp tube switching device to be in a first position and a second position, wherein the HID single light emitting point lamp tube switching device having a switch, a strong current coil, a weak current coil and a timer; said strong current coil and said weak current coil being magnetically coupled to the HID single light emitting point so that the strong current coil and weak current coil being moved between the first position and the second position; comprising the step of:

actuating the switch to cause the strong current coil and weak current coil to move the HID single light emitting point from a first position to a second position;

stopping excitation of the strong current coil at an end of a time period set by the timer; remaining the excitation of the weak current coil so that the HID single light emitting point is remained in a second position.

wherein the first position is a far light position which cause the HID single light emitting point to emit far light, and the second position is a near light position which cause the HID single light emitting point to emit near light; and wherein the second position is a far light position which cause the HID single light emitting point to emit far light, and the first position is a near light position which cause the HID single light emitting point.

* * * * *